Nov. 22, 1960 D. C. GALBRAITH 2,961,033
AIR SPRING SUPPORTED SEAT
Filed Jan. 20, 1958 2 Sheets-Sheet 1
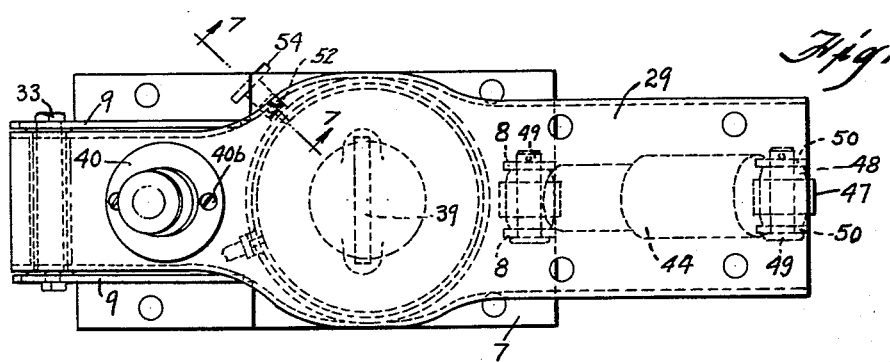
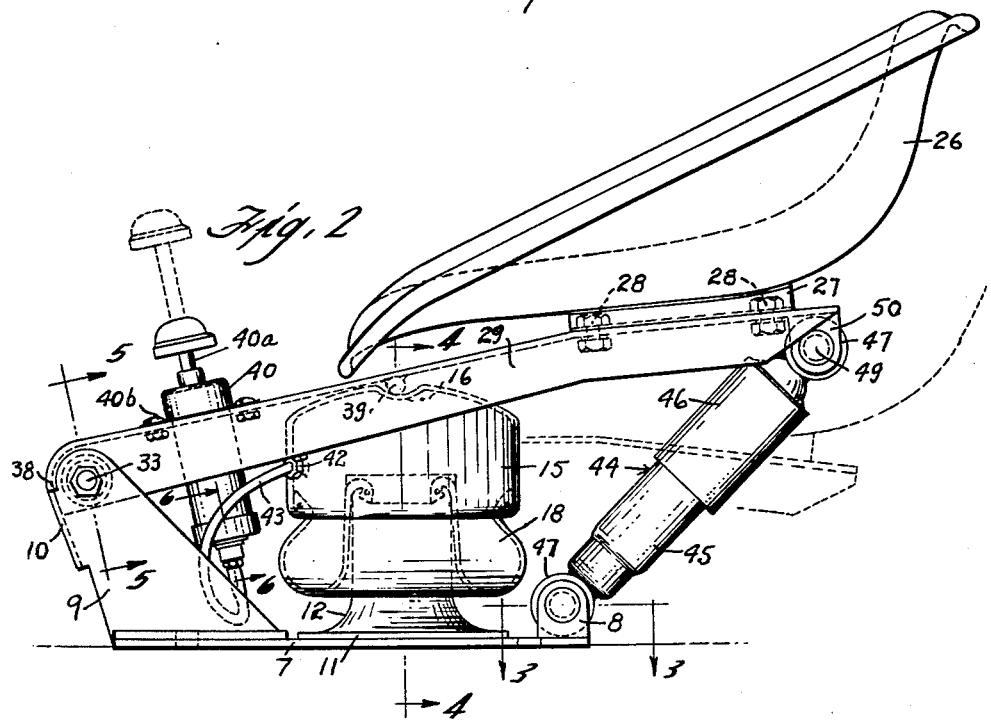
INVENTOR.
Donald C. Galbraith
BY
Louis O. French,
Atty.

Nov. 22, 1960
D. C. GALBRAITH
2,961,033
AIR SPRING SUPPORTED SEAT
Filed Jan. 20, 1958
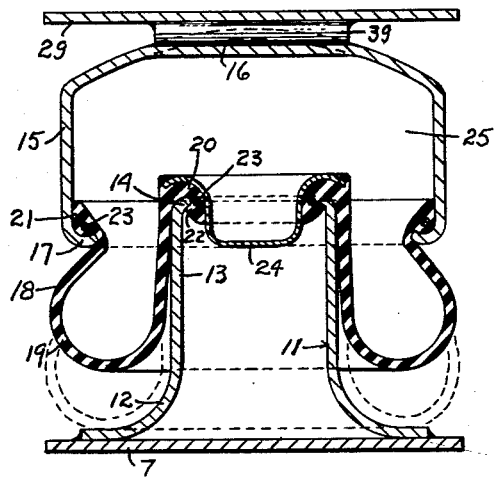
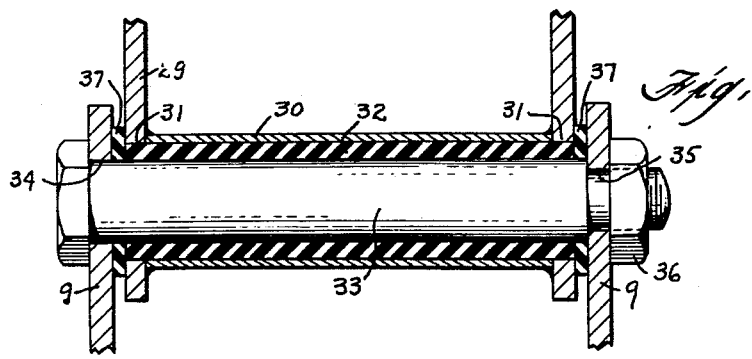
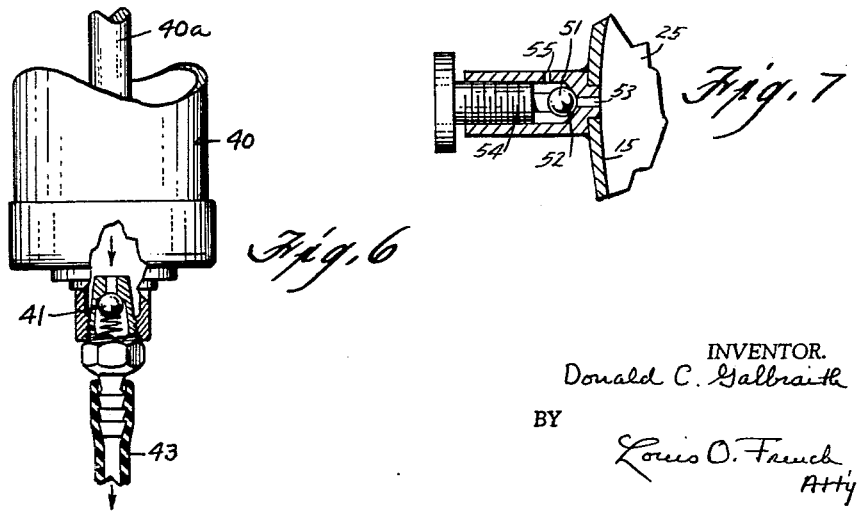
INVENTOR.
Donald C. Galbraith
BY
Louis O. French
Atty.

United States Patent Office 2,961,033
Patented Nov. 22, 1960

1

2,961,033

AIR SPRING SUPPORTED SEAT

Donald C. Galbraith, Milwaukee, Wis., assignor to Milsco Manufacturing Company, Milwaukee, Wis., a corporation of Wisconsin Filed Jan. 20, 1958, Ser. No. 709,874

2 Claims. (Cl. 155—51)

The invention relates to air spring supported seats and more particularly to seats for tractors and the like type of vehicles.

The main object of the invention is to provide a seat mounted on a tiltable support and an air spring structure interposed between said support and a fixed support.

A further object of the invention is to provide an inflatable air spring structure that engages an intermediate portion of a pivoted lever that carries the seat, the lever having a limited amount of upward movement.

A further object of the invention is to provide an air spring supported seat carrying lever and a shock absorber of the airplane type operatively connecting the lever with a fixed support to check the rebound of said air spring.

A further object of the invention is to provide a seat structure of the type above described in which the pivots are mounted in rubber so that no lubrication is required.

A further object of the invention is to provide an air spring support for the seat that may be inflated by an air pump to suit the user's requirements and may be deflated when desired by the operation of a relief valve.

The invention further consists in the several features hereinafter set forth and more particularly defined by claims at the conclusion hereof.

In the drawings:

Fig. 1 is a plan view of the structure embodying the invention, the seat being omitted;

Fig. 2 is a side elevation of the seat structure;

Fig. 3 is a detailed vertical sectional view taken on the line 3—3 of Fig. 2;

Fig. 4 is a detailed vertical sectional view taken on the line 4—4 of Fig. 2;

Fig. 5 is a detailed vertical sectional view taken on the line 5—5 of Fig. 2;

Fig. 6 is a detailed vertical sectional view taken on the line 6—6 of Fig. 2;

Fig. 7 is a detailed vertical sectional view taken on the line 7—7 of Fig. 1.

Referring to the drawings, the numeral 7 designates a metal base plate adapted to be mounted, usually on a raised support of the vehicle, at any convenient height above the floor thereof, said plate having spaced apertured bracket arms 8 and having a bracket member including spaced apertured arms 9 suitably anchored thereto, the above named parts forming a supporting base. The arms 9 are connected together by a transversely disposed metal plate 10 that acts as a stop as hereinafter described.

The air spring structure includes a tubular pedestal or post 11 anchored to the plate 7 and having a conical flared lower end 12 merging into a cylindrical tube portion 13 whose upper end 14 is inwardly flared as shown in Fig. 4. A metal inverted cup-shaped cap member 15 has a transversely extending elongated groove 16 formed in its dome-shaped top and an inwardly curved bottom flange 17 and is operatively connected to the upper end of the pedestal 11 by a diaphragm 18 of yieldable material such as a suitable rubber or synthetic rubber composition. The diaphragm 18 is preferably of general torus-shaped form to

2 provide an annulus 19 that extends downwardly from its inner top portion or rim 20 and its outer top portion or rim 21. The rim 21 is adapted to be sprung over the inner edge of the flange 17 and to seat on this flange in a gas-tight manner. The rim 20 has a portion that seats on the top portion of the flared end 14 and has a downwardly extending lip portion 22 that engages over said end 14 in a gas-tight manner. Each of the rim portions 20 and 21 preferably has a wire ring reinforcement 23. The top of the diaphragm is closed off in a gas-tight manner by a metal closure cap 24 that is bonded to the rim 20. The diaphragm 18 and member 15 form an inflatable air chamber 25 and with the pedestal 11 form an air cushion support for the seat.

The seat itself may be of any suitable construction and in Fig. 2 I have shown a bucket type tractor seat 26 of known form. The base 27 of this seat is secured by bolts 28 to a tiltable support 29. As herein shown, the support 29 is in the form of a metal channel lever pivotally mounted on the arms 9 and carrying the seat 26 on its free end portion. The pivotal connection between the lever 29 and the arms 9 is shown in Fig. 5 and includes a metal tube 30 welded to the channel flanges adjacent openings 31 therein and with said flanges adapted to tightly receive a synthetic rubber tube 32 which is mounted on a pivot bolt 33 that extends through openings 34 and 35 in the arms 9 and is clamped in position thereon by a nut 36. Side thrust of the lever 29 is resisted by washers 37 of yieldable material, such as, a suitable rubber composition. With this arrangement, the lever 29 swings on its rubber mounting tube 32 so that lubrication is not necessary. The web of the channel lever at its pivot end is bent down to provide a stop 38 that is adapted to engage the upper edge of the stop plate 10 to positively limit the upward swinging movement of the lever 29 which is disposed to project over the top of member 15.

A transversely disposed bearing pin 39 (Figures 1 and 2) is welded to the bottom of the web of the lever and works in the groove 16 of the member 15 to transmit the load imposed on said lever 29 by the occupant of the seat to said member.

The air chamber 25 may be inflated to resist the weight of the occupant of the seat by the use of a separate pump having a suitable attachable connection to the chamber similar to that used in inflating bicycle or automobile tires, but it is preferred to mount a bicycle type pump 40, having a manually operated plunger 40a and provided with a spring closed check valve 41, on the lever 29 by screws 40b and connect the discharge end of this pump with an inlet fitting 42, mounted in the member 15, by a flexible hose connection 43.

With the air chamber 25 suitably inflated to the extent desired by the operator, the weight of the occupant of the seat acting through the lever 29 on the member 15 further acts to compress the air in the chamber and causes the annulus 19 to elongate vertically until it engages the conical end portion 12 of the pedestal, which stops its further lengthwise movement as indicated in dotted lines in Fig. 4, the operator then being suspended from the base of the structure by the air column formed in the chamber 25.

To resist any rebound action that may occur due to jolts from uneven terrain over which the vehicle is passing, an airplane type shock absorber 44 of any well known or suitable construction including telescoping sections 45 and 46 is operatively connected to the fixed base and to the free end portion of the lever 29. Each of the sections 45 and 46 has an eyed end 47 adapted to fit over a sleeve 48 of rubber or rubber-like material that in turn fits over a pivot pin 49. As shown in Fig. 3, the pin 49 for the section 45 extends through the openings of arms 8, and in Figs. 1 and 2 the pin 49 for the section 46 extends through openings in spaced bracket arms 50 on the lever 29. This mounting of the pivots for the shock absorber as above described obviates lubricating these pivots.

In order to change the air pressure in the chamber 25 to suit different requirements, a manually operated relief valve 51 is mounted in the member 15. This valve is shown in Fig. 7 as a ball 51 mounted in a housing 52 mounted on the member 15 and held in a closed position over a relief outlet 53 from chamber 25 by a manually rotatable member 54 that has a threaded engagement with the housing 52 which has an outlet 55.

By the term "rubber" as used in the claims I mean to include any suitable rubber or rubber composition.

I desire it to be understood that this invention is not to be limited to any particular form or arrangement of parts except in so far as such limitations are included in the appended claims.

What I claim as my invention is:

1. A seat structure comprising, a fixed base, an elongated supporting platform swingably mounted on said base and carrying a seat remote from said swingable mounting, and an inflatable air spring structure interposed between said platform and said base to yieldingly suspend said seat from said base, said air spring structure including a pedestal having an outwardly flared lower end secured to said base, a dome shaped metal cap having the top thereof rockably coacting with said platform, a flexible generally torous shaped diaphragm sealingly connected about its outer periphery to said cap and about its inner periphery to said pedestal to form an air cushioning chamber, the flared end of said pedestal forming a stop for said diaphragm when distorted toward said base, and means for providing variable pressures within said chamber.

2. A seat structure comprising, a fixed base, an elongated supporting platform swingably mounted on said base and carrying a seat remote from said swingable mounting, and an inflatable air spring structure interposed between said platform and said base to yieldingly suspend said seat from said base, said air spring structure including a pedestal having a lower end rigidly secured to said base and an upper end, a rigid cap having a top rockably coacting with said platform, a flexible generally torous shaped diaphragm sealingly connected to said cap and to said upper end of said pedestal to form an air cushioning chamber, said diaphragm being elongatable vertically along said pedestal and engaging said lower end of said pedestal when distorted toward said base, and manually operated pumping means in pressure delivering communication with said chamber.

References Cited in the file of this patent

UNITED STATES PATENTS

| 4,965 | Lewis | Feb. 10, 1847 |
| 32,848 | Hoagland | July 16, 1861 |
| 477,123 | Johnson | June 14, 1892 |
| 971,583 | Bell | Oct. 4, 1910 |
| 1,141,360 | Rudd | June 1, 1915 |
| 1,898,444 | Hawkins | Feb. 21, 1933 |
| 2,357,825 | Hickman et al. | Sept. 12, 1944 |
| 2,452,280 | Zahller | Oct. 20, 1948 |
| 2,470,907 | White et al. | May 24, 1949 |
| 2,503,796 | Bruhn | Apr. 11, 1950 |
| 2,573,077 | White et al. | Oct. 30, 1951 |
| 2,588,638 | Krotz et al. | Mar. 11, 1952 |

FOREIGN PATENTS

| 833,455 | Germany | Mar. 10, 1952 |